C. R. SANBORN.
RECEPTACLE FOR FLOWERS.
APPLICATION FILED MAY 25, 1910.
980,565.
Patented Jan. 3, 1911.
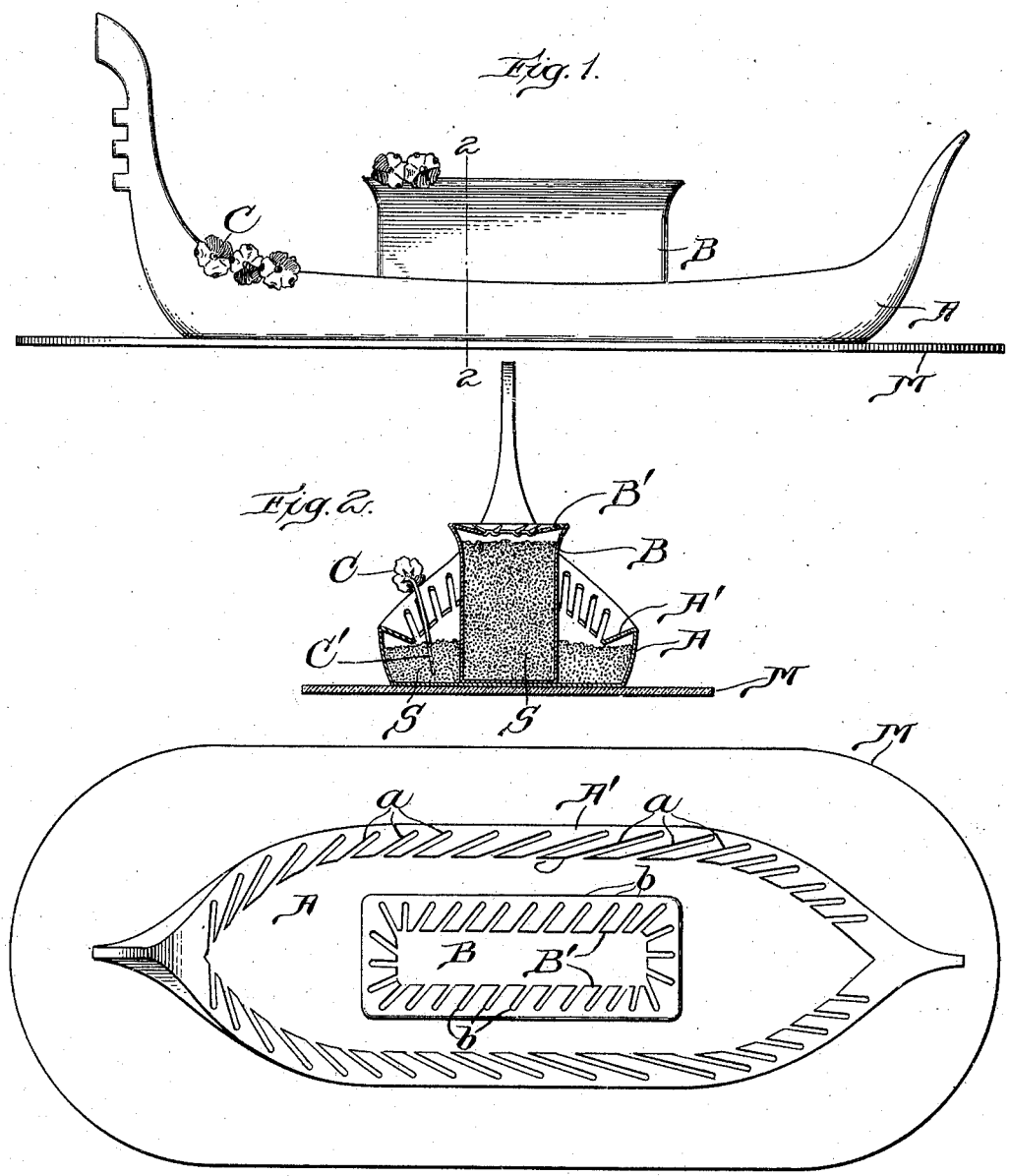

UNITED STATES PATENT OFFICE.

CHARLOTTE REDDEN SANBORN, OF SOMERVILLE, MASSACHUSETTS.

RECEPTACLE FOR FLOWERS.

980,565. Specification of Letters Patent. Patented Jan. 3, 1911.

Application filed May 25, 1910. Serial No. 563,245.

*To all whom it may concern:*

Be it known that I, CHARLOTTE REDDEN SANBORN, a citizen of the United States, and resident of Somerville, in the county of Middlesex and State of Massachusetts, have invented new and useful Improvements in Receptacles for Flowers, of which the following is a specification.

My invention consists in improvements in receptacles for flowers; its objects are, to provide means for arranging flowers in pleasing and ornamental grouping and design, to sustain flowers, particularly the short-stemmed varieties, in their natural posture, as if growing, to dispense with injurious wiring, and to facilitate the arrangement of flowers in designs which otherwise would require the services of a skilled florist.

By means of this invention it is possible also to obtain an effect of continuity or mass in flower arrangement with a smaller quantity of flowers than would be required in pursuing the methods heretofore in vogue.

In the drawings hereto annexed, which illustrate an example of my invention, Figure 1 is a longitudinal elevation of an ornamental flower receptacle; Fig. 2 is a cross section thereof, at the line 2—2 of Fig. 1; and Fig. 3 is a plan view.

The improved flower-receptacle consists essentially of a hollow body, or bowl, which may be made in any desired ornamental shape, (the said body being adapted to contain water or moist earth or sand, for the usual purpose of keeping cut flowers fresh) and which is provided with an inwardly and preferably downwardly turned flange, the flange containing a number of slots or deep notches, open at the inner edge of the flange, and extending toward the outer rim of the bowl or body. By preference, also, these slots are cut diagonally, and terminate quite close to the outer rim of the containing vessel.

The dimensions of the flange and its slots may of course be varied to suit the designer.

Referring to the drawings, Fig. 1, represents a hollow body or container, shaped to resemble a gondola, of which A is the hull, and B the house or superstructure. Both A and B constitute hollow bodies or containers, and both are provided with internal marginal flanges, that of A being shown at A', and that of B at B' (Figs. 2 and 3).

Flange A' is provided with diagonal slots $a$, and flange B' likewise with slots $b$.

The hollow body or container, A or B, being filled with freshening material, such as moist sand, shown at S, flowers, as shown at C, are placed in the container, by slipping the stems C' laterally into the slots $a$ or $b$ in such manner that the flower petals overhang the rim of the bowl, and the stems are then pressed down into the sand, a slender splint, such as a toothpick, being handy for this purpose. The diagonal arrangement of the slots, which I prefer, assists to prevent the flower stems from slipping or springing inward, and also provides in each slot a greater length of stem-holding slot than would be the case if the slots were cut perpendicularly to the side of the container. Moreover, the diagonal arrangement assists materially in flower arrangement, since after selected flowers have been placed in the slots, next to the rim of the container, sprigs of fern, or other green leaved decorations can then be inserted in the slots, so that they close any gaps which may be left between adjacent flowers in the outside row, each slot thus may contain several floral objects, standing in diagonal, or echelon, arrangement, and thus display them to best advantage, enabling relatively few flowers, ferns, etc. to present a solid banked appearance.

The flower receptacle above described is peculiarly well adapted to the arrangement and display of short-stemed flowers, such as pansies, which ordinarily are ill adapted to such purposes as table decoration by reason of the short and slender stems on which they grow. By providing a taller container inside a shallower one, as shown in the drawings, such flowers can be placed in tiers, one above and within the other, so as to present the appearance of a decorative mound, or structure of any desired design and proportions. Moreover, the flowers are held in a natural position, and appear as if growing from a bed.

If a mirror, such as shown at M, be used as the mat or base on which the flower receptacle rests, a pleasing double effect is obtained by reflection.

The container may be made of any material which lends itself to the peculiarities of construction above described; sheet metal, which is easily wrought into various shapes, and may be colored as desired, is probably the best available.

What I claim and desire to secure by Letters Patent is:

1. In a receptacle for flowers, the combination of a hollow body, an inturned flange at the rim thereof, said flange being slotted at intervals from the inner edge toward the rim of the body.

2. In a receptacle for flowers, the combination of a hollow body, an inturned flange at the rim thereof, said flange being slotted at intervals from the inner edge diagonally toward the rim of the body.

Signed by me at Boston, Massachusetts this 19th day of May 1910.

CHARLOTTE REDDEN SANBORN.

Witnesses:
 ODIN ROBERTS,
 CHARLES D. WOODBERRY.